United States Patent
Amirijoo et al.

(10) Patent No.: US 9,137,686 B2
(45) Date of Patent: Sep. 15, 2015

(54) METHOD AND ARRANGEMENT FOR CELL OUTAGE COMPENSATION IN A COMMUNICATION NETWORK SYSTEM

(75) Inventors: Mehdi Amirijoo, Linköping (SE); Mikael Coldrey, Landvetter (SE); Pål Frenger, Linköping (SE); Fredrik Gunnarsson, Linköping (SE); Johan Moe, Mantorp (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 213 days.

(21) Appl. No.: 13/885,451

(22) PCT Filed: Nov. 16, 2010

(86) PCT No.: PCT/SE2010/051262
§ 371 (c)(1),
(2), (4) Date: May 15, 2013

(87) PCT Pub. No.: WO2012/067555
PCT Pub. Date: May 24, 2012

(65) Prior Publication Data
US 2013/0244644 A1 Sep. 19, 2013

(51) Int. Cl.
*H04W 40/06* (2009.01)
*H04W 24/02* (2009.01)
(Continued)

(52) U.S. Cl.
CPC .............. *H04W 24/02* (2013.01); *H04W 24/04* (2013.01); *H04B 7/024* (2013.01); *H04W 16/28* (2013.01); *H04W 40/06* (2013.01)

(58) Field of Classification Search
CPC ..... H04W 24/02; H04W 16/28; H04W 24/04; H04W 40/06; H04W 7/024
See application file for complete search history.

(56) References Cited

U.S. PATENT DOCUMENTS

| 6,097,956 A | 8/2000 | Veeravalli et al. |
| 2005/0233715 A1* | 10/2005 | Laroia et al. ............. 455/133 |

(Continued)

FOREIGN PATENT DOCUMENTS

| EP | 1 611 758 | 1/2006 |
| EP | 2 154 918 | 2/2010 |

(Continued)

OTHER PUBLICATIONS

International Search Report for PCT/SE2010/051262, mailed Aug. 17, 2011.

(Continued)

*Primary Examiner* — Quan M Hua

(57) ABSTRACT

The present invention relates to an arrangement, a communication network node and method for cell outage compensation in a communication network system comprising a plurality of communication network nodes (15a, 15b) communicating with user equipments (18), where each network node (15a, 15b) is serving at least one cell (19a, 19b), in which the user equipments (18) are situated, via two or more reconfigurable physical antennas (15a1, 15a2, 15b1, 15b2) configured according to an initial antenna parameter set. Cell outage is determined in a network node (15b). One of the reconfigurable physical antennas (15a2) of at least one cell (19a) is made temporarily available for compensation. The available antenna (15a2,) is prepared for compensation by reconfiguring one or more antenna parameters thereof in accordance with a compensating antenna parameter set. A new compensating cell (20) is transmitted from the prepared antenna (15a2). Upon cell recovery the compensating cell (20) is removed and the reconfigurable physical antennas (15a2) of the compensating cell (20) returned to the initial antenna parameter set.

15 Claims, 12 Drawing Sheets

(51) Int. Cl.
*H04W 24/04* (2009.01)
*H04B 7/02* (2006.01)
*H04W 16/28* (2009.01)

(56) References Cited

U.S. PATENT DOCUMENTS

| | | | |
|---|---|---|---|
| 2006/0040707 A1 | 2/2006 | Kish et al. | |
| 2006/0084441 A1* | 4/2006 | Dowling | 455/445 |
| 2007/0248113 A1* | 10/2007 | Ko et al. | 370/436 |
| 2008/0064361 A1* | 3/2008 | Bjork et al. | 455/403 |
| 2010/0216453 A1 | 8/2010 | Kallin et al. | |
| 2012/0004001 A1* | 1/2012 | Power et al. | 455/507 |

FOREIGN PATENT DOCUMENTS

| WO | WO 2008/030171 | 3/2008 |
|---|---|---|
| WO | WO 2009/078764 | 6/2009 |
| WO | WO 2010/071492 | 6/2010 |
| WO | WO 2011/105938 | 9/2011 |

OTHER PUBLICATIONS

Written Opinion for PCT/SE2010/051262, mailed Aug. 17, 2011.

* cited by examiner

METHOD AND ARRANGEMENT FOR CELL OUTAGE COMPENSATION IN A COMMUNICATION NETWORK SYSTEM

This application is the U.S. national phase of International Application No. PCT/SE2010/051262 filed 16 Nov. 2010 which designated the U.S., the entire content of which is hereby incorporated by reference.

TECHNICAL FIELD

The present invention relates to a method, an arrangement and a communication network node in a communication network system and, more particular to methods, arrangements and communication network nodes allowing for cell outage compensation in a communication network system.

BACKGROUND

One important focus area in E-UTRAN standardization work is to ensure that a new network is simple to deploy and cost efficient to operate. The vision is that new systems shall be self-organizing in as many aspects as possible.

In current wireless communication systems there are situations when a whole base station or part of the base station (e.g. a sector/cell of a sectorised base station) is in outage due to hardware/software failures.

When in outage the cell/base station cannot support any users in its vicinity and if these users cannot connect to another base station in the neighborhood then a coverage hole is created.

For the operators of wireless access networks this is undesirable consequence as potential revenue is missed from the unsupported traffic and also customer satisfaction is damaged.

A common practice today is that the wireless operators aim at repairing the malfunctioning cell/base stations as soon as possible (and therefore restoring the original coverage) without taking any compensation measures until the failure is repaired.

The goal of cell outage management is to minimize the network performance degradation when a cell is in outage through quick detection and compensation measures. The latter is done by automatic adjustment of network parameters in surrounding cells in order to meet the operator's performance requirements based on coverage and other quality indicators, e.g., throughput, to the largest possible extent.

Such network parameters may have an impact on the antenna configuration in terms of mechanical tilt (the antenna is rotated vertically), electrical tilt (the antenna max gain direction is rotated vertically by adjusting antenna element configuration inside the antenna), elevation (the combined effect from electrical and mechanical tilt), antenna lobe direction or azimuth (the antenna max gain is rotated horizontally), antenna lobe shape (the beam shape of the antenna, often characterized by horizontal and vertical beamwidths).

Altering the radio parameters of the neighboring cells means that some of the user equipments (UEs) served by those cells may be affected. This has to be taken into account as a coverage loss in the neighboring cells may not be tolerated.

Thus there is a need to address the problems with today's solutions, namely that coverage holes are not alleviated. This is an undesirable consequence as potential revenue is missed from the unsupported traffic and also customer satisfaction is damaged. This is particularly critical for services with a negotiated quality such as a guaranteed bit rate.

One previous attempt is disclosed in WO 2008030171, in which document is described a network reconfigurator for use in a telecommunications network comprising a network of radio base stations configured for providing radio access service to the telecommunications network for wireless stations. The network reconfigurator is arranged or configured, for differing service outages attributable to differing downed radio base stations of the network of radio base stations, to coordinately and dynamically change modifiable characteristics of plural remaining base stations for at least partially compensating for the service outages. Preferably the reconfigurator is configured, for differing service outages, to dynamically change differing modifiable characteristics of differing plural remaining base stations for at least partially compensating for the service outages. Modifying a characteristic of the plural remaining base stations can include modification of one or more of the following: antenna tilt of at least one of the plural remaining base station; power of a downlink common control channel of at least one of the plural remaining base stations; composition of a neighbor list of at least one of the plural remaining base stations; a parameter pertaining to one of handover, cell power, and cell size for the at least one of the plural remaining base stations.

A further document, US 2006/0084441 A1, describes how selected base stations are arranged to adjust the azimuth and elevation antenna radiation pattern of beams so as to reorient the beams to restore services previously provided by a disabled cell.

The document WO 2009/078764 also mentions that the coverage area, caused due to failure, can be altered by adjusting the position of one or more antennas.

One problem with the solutions suggested in accordance with the above mentioned documents is that coverage in neighboring cells may be lost when changing the antenna parameters.

SUMMARY

Accordingly, one objective with the present invention is to provide an improved method for cell outage compensation in a communication network system comprising a plurality of communication network nodes communicating with one or more user equipments, where each network node is serving at least one cell, in which the user equipments are situated, via two or more reconfigurable physical antennas configured according to an initial antenna parameter set.

According to a first aspect of the present invention this objective is achieved through a method which comprises the steps of: determining cell outage in a network node; making one of the reconfigurable physical antennas of at least one cell temporarily available for compensation; preparing the available reconfigurable physical antenna for compensation by reconfiguring one or more antenna parameters thereof in accordance with a compensating antenna parameter set; transmitting a new compensating cell from the prepared reconfigurable physical antenna; upon cell recovery removing the compensating cell and returning the reconfigurable physical antennas of the compensating cell to the initial antenna parameter set.

A further objective of the present invention is to provide an improved arrangement for cell outage compensation in a communication network system comprising a plurality of communication network nodes communicating with one or more user equipments, where each network node is serving at least one cell, in which the user equipments are situated, via two or more reconfigurable physical antennas configured according to an initial antenna parameter set.

According to a second aspect of the present invention this further objective is achieved through an arrangement which comprises: a control unit for determining cell outage in a network node; a switching arrangement for making one of the reconfigurable physical antennas of at least one cell temporarily available for compensation; a reconfiguration arrangement for preparing the available reconfigurable physical antenna for compensation by reconfiguring one or more antenna parameters thereof in accordance with a compensation antenna parameter set; a transmitter arranged to transmit a new compensating cell from the prepared reconfigurable physical antenna; a switching and reconfiguration arrangement for upon cell recovery removing the compensating cell and returning the reconfigurable physical antennas of the compensating cell to the initial antenna parameter set.

A yet further objective of the present invention is to provide an improved communication network node for cell outage compensation in a communication network system comprising a plurality of communication network nodes communicating with one or more user equipments, where each network node is serving at least one cell, in which the user equipments are situated, via two or more reconfigurable physical antennas configured according to an initial antenna parameter set.

According to a third aspect of the present invention this further objective is achieved through a communication network node which comprises: a control unit for determining cell outage in a network node; a switching arrangement for making one of the reconfigurable physical antennas of at least one cell temporarily available for compensation; a reconfiguration arrangement for preparing the available reconfigurable physical antenna for compensation by reconfiguring one or more antenna parameters thereof in accordance with a compensating antenna parameter set; a transmitter arranged to transmit a new compensation cell from the prepared reconfigurable physical antenna; a switching and reconfiguration arrangement for upon cell recovery removing the compensating cell and returning the reconfigurable physical antennas of the compensating cell to the initial antenna parameter set.

Further embodiments are listed in the dependent claims.

Thanks to the provision of a method, an arrangement and a communication network node which provides for cell outage compensation in a communication network system several advantages are provided.

Using the teachings of the invention, solutions to as far as possible maintaining an original cell even during cell outage is provided. The teachings of the invention also enable that cell parameters (e.g. antenna tilt) are optimized for cell outage compensation while the negative effects of the compensating cells are minimized.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
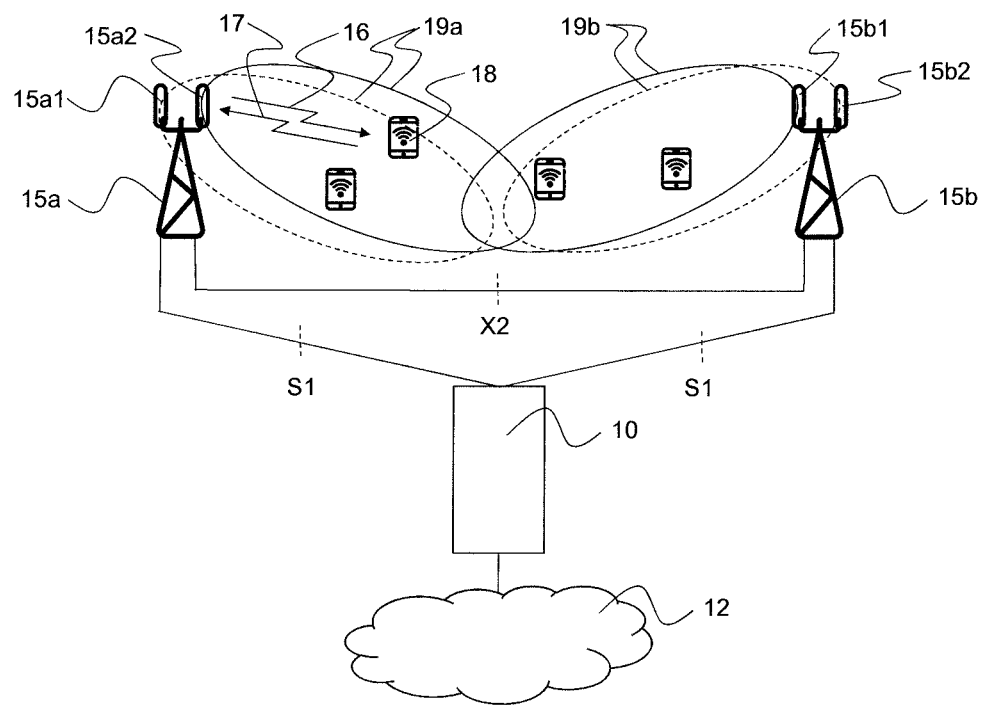
FIG. 1 is a schematic illustration of a first communication network architecture according to the present invention.

FIG. 1 depicts a communication system including a Radio Access Network (RAN), such as the Evolved Universal Terrestrial Radio Access Network (E-UTRAN) architecture, comprising at least one Radio Base Station (RBS) 15a, 15b also denoted as NodeB or NB (Node B) for short, (two are shown in FIG. 1). Compared to traditional GSM and UMTS networks, the E-UTRAN does not include a BSC (Base Station Controller) or RNC (Radio Network Controller) functional entity. Instead, many of the controlling functions have been moved towards the Radio Base Stations (RBS) 15a, 15b also denoted as eNodeB or eNB (Evolved Node B) for short, which interconnects directly with the Evolved Packet Core (EPC) 10 across an S1 Interface. The eNodeB 15a, 15b includes a Radio Resource Controller (RRC) function and therefore provides access and mobility control. The eNodeB's 15a, 15b are interconnected with each other by means of an X2 interface. It is assumed that there always exists an X2 interface between the eNodeB's 15a, 15b that need to communicate with each other, e.g. for support of handovers.

The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the RBS 15a, 15b transmits data blocks to each UE 18. On the uplink channel 17, the UEs 18 transmit data blocks to the RBS 15a, 15b.

According to a preferred embodiment of the present invention, the communication system is herein described as an Evolved-UMTS communication system. The skilled person, however, realizes that the inventive method and arrangement works very well on other communications systems as well, such as other UMTS based communications systems.

The UEs 18 may be mobile stations such as mobile telephones ("cellular" telephones) and laptops with mobile termination and thus may be, for example, portable, pocket, hand-held, computer-included or car-mounted mobile devices which communicate voice and/or data with the RAN.

The present invention is based on the realization that reconfigurable antennas 15a1, 15a2, 15b1, 15b2 may be utilized in order to ensure that a new network is simple to deploy and cost efficient to operate. In particular the possibilities provided by reconfigurable antennas 15a1, 15a2, 15b1, 15b2 have been considered for providing upon cell outage a new compensating cell which is supported by one or several of the physical antennas in a neighboring cell, where the neighboring cell maintains the original cell supported by the remaining physical antennas.

The present invention is further based on the believe that it will not be possible to implement solutions where the UEs 18 may suffer radio coverage loss. It is believed that operators would be very hesitant to activate such a feature. The present invention is therefore based on the presumption that it must be possible to keep UEs 18 in coverage even during a compensation phase. Thus in the following will be provided a possible solution to that problem.

Figure 11:
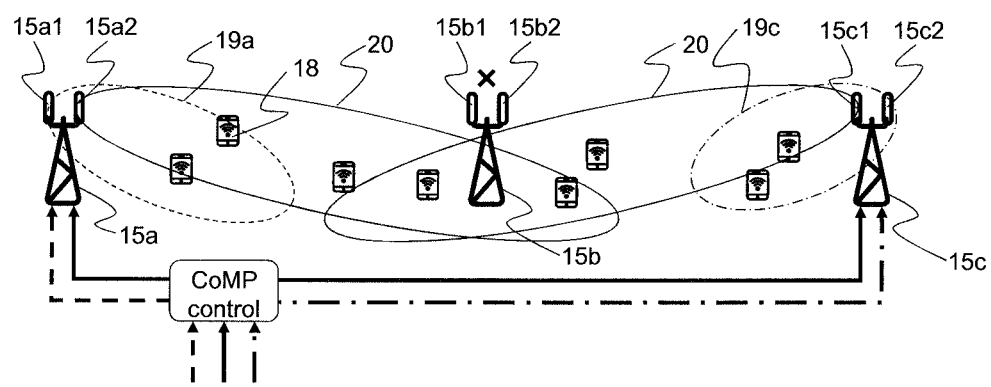
FIG. 11 is a simplified illustration of how several neighboring base stations may coordinate their transmissions and/or reception in order to increase the coverage in the outage area, in this case by creating one compensating.

The proposed invention builds on utilization of reconfigurable antennas 15a1, 15a2. The base station 15a in the vicinity of a failed base station 15b start at least one other cell 20 in parallel with the nominal (old) one 19a we call the new cell 20 a compensating cell. The compensating cell 20 may, as illustrated in FIG. 11, be supported by a plurality of neighboring base stations 15a, 15c. The compensating cells 20 can operate on the same frequency or it may operate on a smaller bandwidth than the nominal cell 19a. The compensating cell 20 may also be time shifted compared to the nominal cell 19a. The compensating cell 20 may also use a different tilt or lobe direction compared to the nominal cell 19a. This implies that the area covered by the nominal 19a and the compensating cells 20 may be significantly different. The main benefit of this approach is that the area previously served by a neighboring base station 15b is maintained while the compensating cell 20 can now serve the area no longer covered by the failed cell 19b.

Further, the base stations that are best suited to handle the traffic in the outage area can be identified by considering the traffic handled by those base stations.

For the following examples it is assumed that each base station 15a, 15b is equipped with two or more physical antenna ports. The reason for having more than one physical port can be Multiple Input Multiple Output (MIMO) support. In LTE Rel-8 a cell can have 1, 2, or 4 physical antenna ports and different reference signals will be sent out on each of them depending on the number of physical ports on an antenna.

In LTE a UE 18 determines the number of antenna ports supported in a cell by decoding the physical broadcast channel (PBCH). The number of antenna ports is not explicitly signaled on the PBCH and it cannot be changed without a complete re-start of the cell. Since the LTE Rel-8 standard stipulates that the physical downlink shared channel (PDSCH) shall use the same antenna ports as the PBCH the UE 18 already knows the number of antenna ports once it has succeeded in decoding the PBCH properly. The UE 18 determines the number of antenna ports that a cell supports once, and after that the UE 18 never re-evaluates this decision.

In the following will be used the terms virtual antenna ports and physical antenna ports. A physical antenna port is a physical connector that connects to a physical antenna element. There is a one-to-one mapping between one physical antenna port and one corresponding physical antenna element.

A virtual antenna port is defined as a reference signal that is visible by the mobile stations. Traditionally the convention is to have a one-to-one mapping between virtual antenna ports and physical antenna ports and therefore it is often not necessary to distinguish between them. However, for an understanding of the present invention this distinction is important.

In order to address the determination of the UE 18 of the number of antenna ports supported in a cell when providing a compensation cell 20 one may e.g. in the case of four physical antenna ports mute one physical antenna port, e.g. physical antenna port 3, and add virtual antenna ports 3 and 2 and transmit the resulting sum signal on physical antenna port 2. One may also add the different virtual antenna ports with various (possibly pseudo random) combination weights.

Note that a cell traditionally is defined as the coverage area of the system broadcast channel. That definition for a cell will be used herein. Each cell typically has several virtual antenna ports, and most often the number of virtual antenna ports defined in a cell exactly matches the number of physical antenna elements at the radio base station that are dedicated to transmitting the cell.

Figure 2:
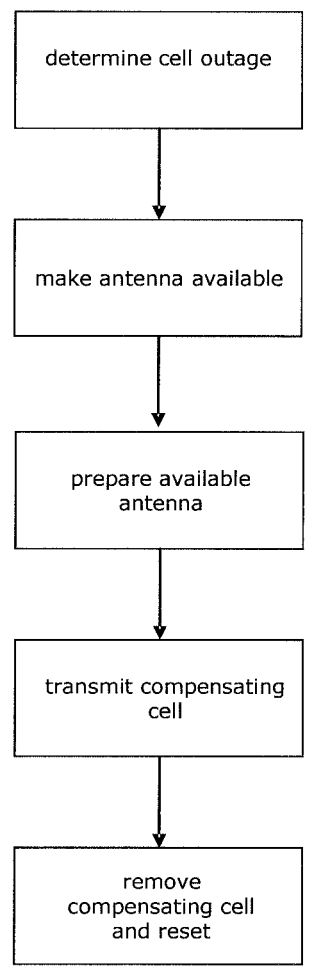
FIG. 2 is a flowchart illustrating the method in accordance with the present invention.

The different steps of the method in accordance with the present invention, as illustrated in FIG. 2, may be summarized as follows.

Initially, cell outage in a network node 15b is determined.

Thereafter, one of the reconfigurable physical antennas 15a2 of at least one cell 19a is made temporarily available for compensation.

In a next step, the available reconfigurable physical antenna 15a2 is prepared for compensation by reconfiguring one or more antenna parameters thereof in accordance with a compensating antenna parameter set.

Thereafter, a new compensating cell 20 is transmitted from the prepared reconfigurable physical antenna 15a2.

Upon cell recovery, the compensating cell 20 is removed and the reconfigurable physical antenna 15a2 of the compensating cell 20 returned to the initial antenna parameter set.

In one embodiment the step of preparing the available reconfigurable physical antenna 15a2 for compensation by reconfiguring one or more antenna parameters thereof in accordance with a compensating antenna parameter set comprises reconfiguring at least one of: antenna tilt; antenna lobe direction; antenna lobe shape; antenna azimuth; and antenna elevation.

In an alternative embodiment the step of making one of the reconfigurable physical antennas 15a2 of at least one cell 19a temporarily available for compensation comprises transmitting n+1 virtual antenna ports from the n remaining physical antennas 15a1 of the at least one network node 15a used for transmitting the compensating cell 20.

In yet an alternative embodiment the method further comprises the step of transmitting reference signals of the compensating cell 20 shifted in time with respect to reference signals transmitted from the n remaining physical antennas 15a1 of the at least one network node 15a used for transmitting the compensating cell 20.

In a further alternative embodiment the method further comprises the step of scheduling uplink and downlink data transmitted from the n remaining physical antennas 15a1 of the at least one network node 15a used for transmitting the compensating cell 20 in a bandwidth separated from the bandwidth allocated to the compensating cell 20.

In a still further alternative embodiment the method further comprises the step of allowing transmissions from the n remaining physical antennas 15a1 of the at least one network node 15a used for transmitting the compensating cell 20 split bandwidth with transmissions from the compensating cell 20 through transmissions from the compensating cell 20 being shifted in frequency with respect to transmissions from the n remaining physical antennas 15a1 of the at least one network node 15a used for transmitting the compensating cell 20.

Figure 4:
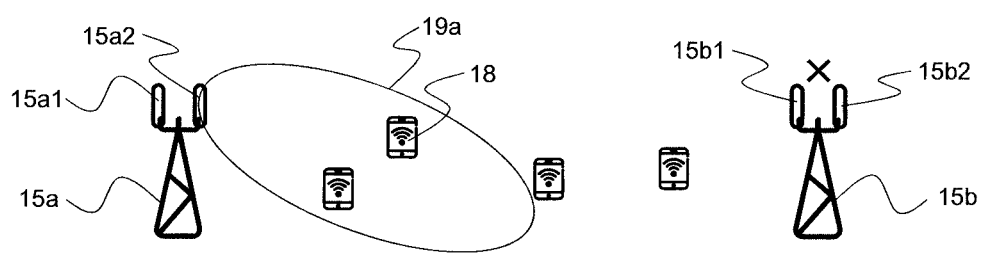
FIG. 4 is a simplified illustration of muting of one antenna in preparation of compensation.
Figure 5:
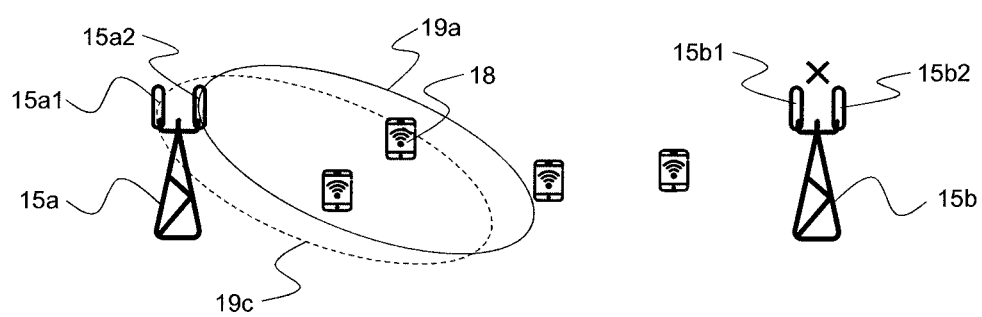
FIG. 5 is is a simplified illustration of the creation of a new temporary cell (dashed)
Figure 6:
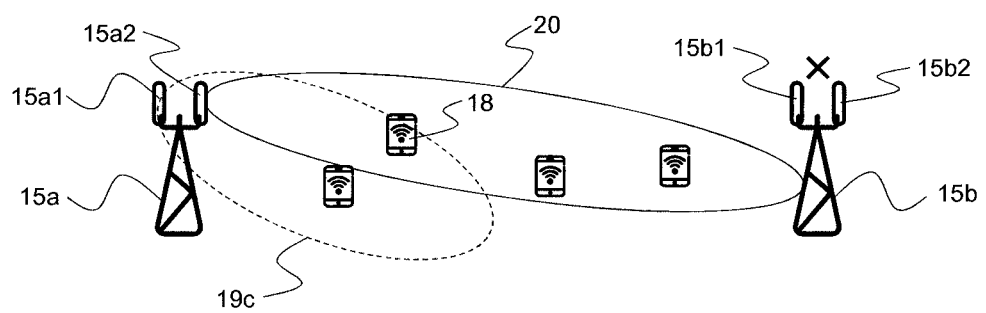
FIG. 6 is a simplified illustration of a new compensating cell with pre-calculated compensation parameters.

In an additional further alternative embodiment, as illustrated in FIGS. 4, 5 and 6, the step of making one of the reconfigurable physical antennas 15a2 of at least one cell 19a temporarily available for compensation comprises the further steps of: muting at least one reconfigurable physical antenna 15a1 of the at least one network node 15a; creating a new temporary cell 19c at the previously muted reconfigurable physical antenna 15a1; forcing handover of UEs 18 served by at least one other reconfigurable physical antenna 15a2 of the at least one network node 15a to the new cell 19c; muting the at least one other reconfigurable physical antenna 15a2 of the at least one network node 15a and making the at least one other reconfigurable physical antenna 15a2 of the at least one network node 15a temporarily available for compensation.

In FIG. 1 is shown an example of the situation during normal operation and as the cell outage compensation algorithm begins by preparing the compensating radio base station 15a. Here is relied on that the compensating cell is MIMO capable and therefore it has at least two physical antennas 15a1, 15a2 and two power amplifiers. If the compensating cell is an LTE cell then it is possible to mute one or several of the virtual antenna ports to make at least one physical antenna available for outage compensation.

Figure 3:
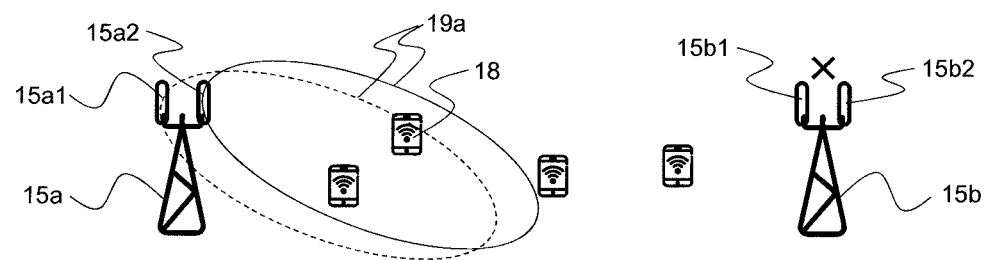
FIG. 3 is a simplified illustration of an example of cell outage occurring in accordance with the present invention.

FIG. 3 shows the same network after a cell outage has occurred for one of the cells 19b in one of the radio base stations 15 b. A cell outage typically means that some UEs 18 loose coverage. In FIG. 3, the two UEs 18 previously covered by cell 19b would typically loose coverage in this case.

In FIG. 4 is shown how, in one embodiment, at least one antenna 15a1 in the compensating base station 15a is muted. In case of LTE, the performance of the nominal cell 19a in the compensating base station 15a is significantly reduced by the antenna muting. Therefore if we expect that the cell outage compensation will last for some considerable amount of time (e.g. several hours) it might be a good idea to re-configure the compensating RBS 15a to transmit a cell where no antenna ports are muted, e.g. a cell where there are one physical and virtual antenna ports. Reconfiguring the compensating RBS 15a, e.g., changing number of virtual ports, bandwidth etc will improve the performance of the compensating cell. It is of course possible to continue with the old configuration, but mute the virtual antenna ports.

In FIG. 5 is assured that all UEs 18 previously served by cell 19a performs a handover to the new temporary cell 19c, and in FIG. 6 we have closed down the original cell 19a and are prepared actual for the cell outage compensation.

The compensating RBS 15a is prepared for cell outage compensation and we have ensured that at least one physical antenna 15a2 and one power amplifier is available for this purpose. In FIG. 6 a new compensating cell 20 has been started on the hardware resources made available. In a preferred embodiment the compensating cell 20 uses different parameters (e.g. antenna tilt, beam-width, and transmission power is adjusted for optimum cell outage compensation performance). Note that this might imply adjusting the physical properties of individual antenna elements, e.g. by physically moving the antenna 15a2 with an electrical tilt. It might also imply using a different set of RACH parameters etc. In a preferred embodiment the adjusted parameter set for the compensating cell 20 is pre-calculated during a network planning phase or by an automatic SON algorithm.

The compensating cell 20 should have its own physical cell identity. However, the compensating cell 20 needs not to be using full bandwidth, but a fraction and it can be one idea to shift its reference signals in time to improve decoding.

Further, in the embodiment where a temporary cell 19c is created, as illustrated in FIGS. 4 and 5, UL and DL data in the temporary cell 19c may not be scheduled in the bandwidth allocated to the compensating cell 20 in order to avoid unnecessary inter-cell interference from the original cell 19b. Alternatively, the temporary cell 19c and the compensating cell 20 may split the original bandwidth.

Figure 7:
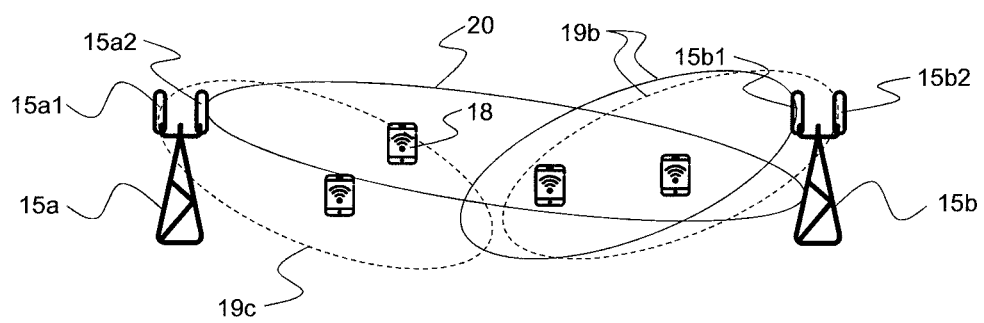
FIG. 7 is a simplified illustration as the cell previously suffering outage becomes operational again.
Figure 8:
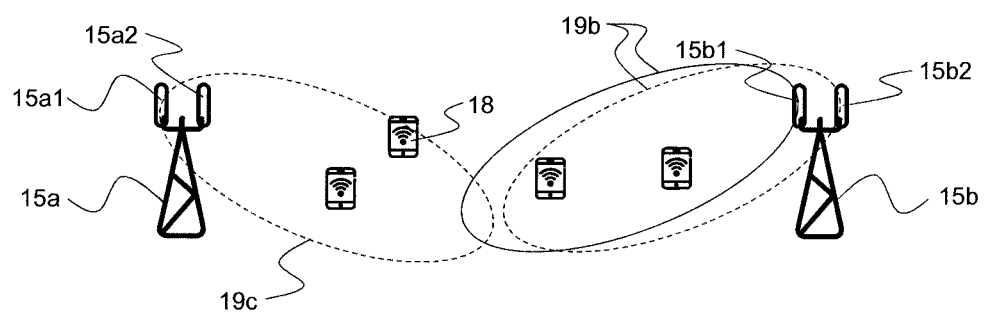
FIG. 8 is a simplified illustration of removal of the compensating cell.
Figure 9:
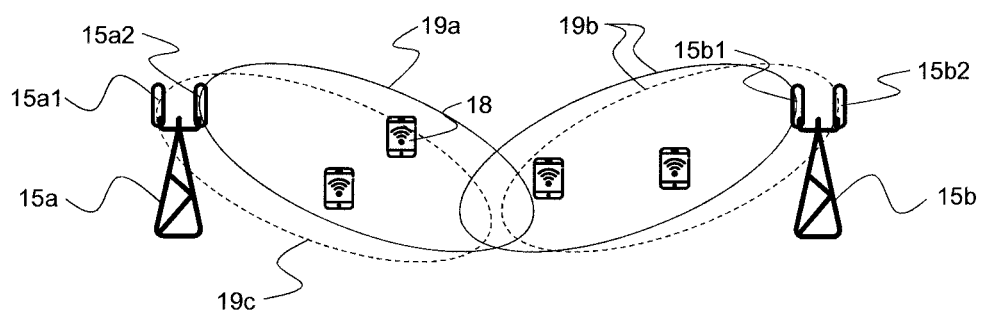
FIG. 9 is a simplified illustration of how a new cell, optimized for normal operation, is started.

Once the broken cell 19b is mended (see FIG. 7) and operational again a similar procedure follows the reverse order. The UEs 18 that are better served by the mended cell 19b performs handover and the compensating cell 20 is removed (FIG. 8). A new cell 19a optimized for normal mode operation is started (FIG. 9, note that this is not needed if a temporary cell 19c was not created in the preparation phase). The UEs 18 performs handover to the new normal mode cell 19a. The temporary cell 19c is shut down and finally the antenna elements 15a1 that have been made available are un-muted and the system is back to normal mode operation in accordance with FIG. 1 again.

The optional (in HSPA not necessary) steps using a temporary cell 19c as described above with reference to FIGS. 5, 6, 7, 8 and 9, may, in another embodiment, be skipped and a compensating cell 20 started directly on the hardware resources made available at physical antenna 15a1 in FIG. 4, while at the same time retaining the nominal cell 19a at physical antenna 15a2.

Similarly, in this alternative embodiment, where no temporary cell 19c is created, UL and DL data in the nominal cell 19a may not be scheduled in the bandwidth allocated to the compensating cell 20 in order to avoid unnecessary inter-cell interference from the original cell 19b. Alternatively, the nominal cell 19a and the compensating cell 20 may split the original bandwidth.

Figure 10:
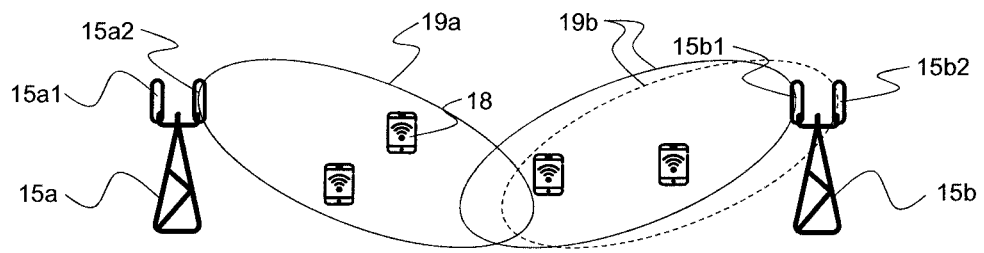
FIG. 10 is is a simplified illustration of how the old temporary cell is turned off.

Further, in this alternative embodiment where no temporary cell 19c is created, once the broken cell 19b is mended the compensating cell 20 is shut down, creating a situation as illustrated in FIG. 10, and finally the antenna elements 15a1 that have been released are returned to the nominal cell 19a and the system is back to normal mode operation in accordance with FIG. 1 again.

To increase the received signal power and to reduce the inter-cell interference, more than one base station 15a, 15c can support a compensating cell 20 as shown in FIG. 11. In this example, a physical antenna port in two compensating base stations 15a, 15c support the compensating cell 20 and the same reference signal and PCI are transmitted from both base stations 15a, 15c thus, creating one compensating cell 20.

There are several parameters related to the compensating cell that need to be set. The bandwidth split between the temporary 19c and compensating cell 20 may be based on factors related to load distribution, e.g.: number of UEs 18 served in the nominal 19a and estimated number of UEs 18 served by the compensating cell 20 (For example, if many UEs 18 are served by the compensating cell 20 compared to the nominal cell 19a, then the bandwidth of the compensating cell 20 may be set to a high value); quality experienced by the UEs 18 in the nominal 19a and compensating cells 20; load or utilization of the nominal 19a and compensating cells 20.

Another issue is related to the number of physical antenna ports assigned to the compensating cell 20. The more physical antenna ports that are assigned to the compensating cell 20, the more potential the compensating cell 20 has to cover the area that is in outage. For example, if one physical antenna port is assigned to the compensating cell 20, then the coverage of the compensating cell 20 will be less, i.e., the compensation potential will be smaller, compared to when two physical antenna ports are assigned to the compensating cell 20. In the latter case, the compensating cell 20 may benefit from spatial diversity.

The number of physical antennas 15a1, 15a2 assigned to the compensating cell 20 also depends on the load applied to the nominal 19a and the compensating cells 20. If the neighboring cell has a high load, then more physical antennas 15a1, 15a2 can be assigned to the compensating cell 20 in order to increase the capacity of the compensating cell 20.

There are several methods for defining or tuning the compensating cells 20. One method is to use planning tools and on forehand decide which base stations should compensate another if it is broken and to what level. The exact approach for achieving this is outside the scope of this invention.

Figure 12:
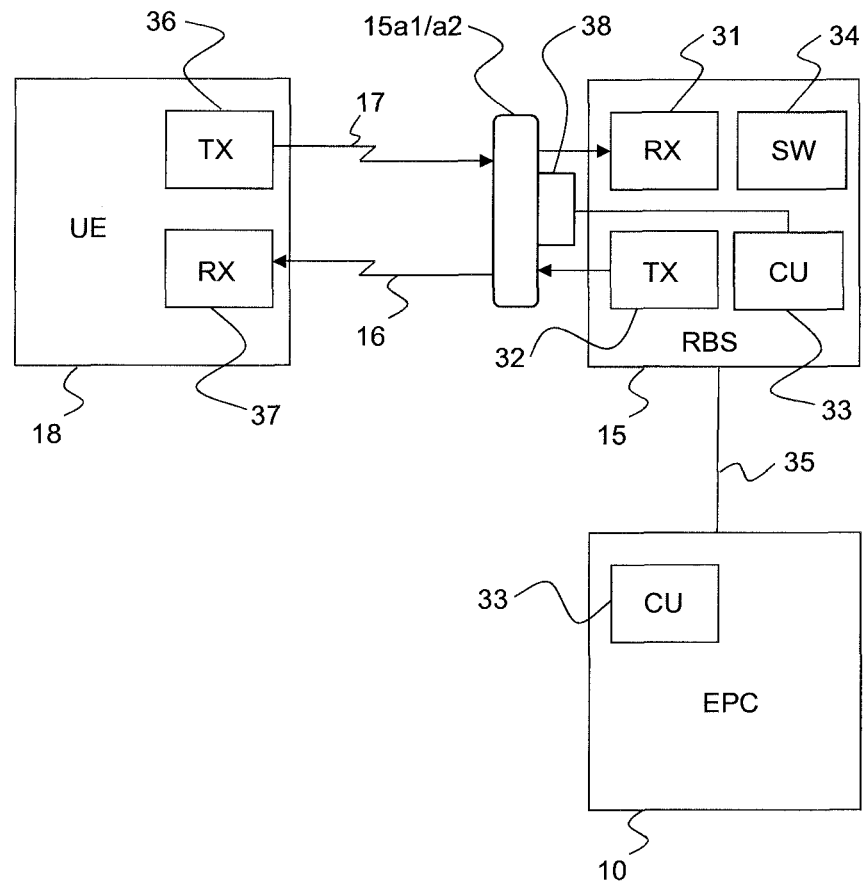
FIG. 12 is a simplified block diagram of a user equipment and an inventive communication network node and associated Evolved Packet Core.

The present invention further, as illustrated in FIG. 12, relates to an arrangement for cell outage compensation in a communication network system comprising a plurality of communication network nodes 15a, 15b communicating with one or more UEs 18, where each network node 15a, 15b is serving at least one cell 19a, 19b in which the UEs 18 are situated via two or more reconfigurable physical antennas 15a1, 15a2, 15b1, 15b2 configured according to an initial antenna parameter set.

The arrangement in accordance with the present invention comprises a control unit 33 for determining cell outage in a network node 15b. The determination functionality of a RAN, such as the E-UTRAN architecture, may, although potentially performed exclusively by the network node 15, be wholly or partially distributed between subordinate controlling units CU 33, which, as illustrated in FIG. 12, may be located within the network node 15 or alternatively within an Evolved Packet Core (EPC) 10 or yet alternatively distributed between both the network node 15 and the EPC 10.

A switching arrangement 34 is provided for making one of the reconfigurable physical antennas 15a2 of at least one cell 19a temporarily available for compensation.

The switching arrangement 34 may be arranged to perform virtual antenna port muting or optionally virtual antenna port re-direction for enabling transmission of a compensating cell 20 during a compensating mode. As an example, in preferred method of transmitting a compensating cell in LTE, a cell is equipped with four physical antennas that are all active during normal mode operation. During the compensating mode, one of the physical antenna elements and a corresponding power amplifier are made available for the compensating cell 20 by means of virtual antenna port muting or re-direction. By muting it is meant that a reference signal associated with virtual antenna port is no longer transmitted. Alternatively, the reference signal associated with the virtual antenna port can be transmitted by another power amplifier and physical antenna. The probing cell can be configured with one single antenna port, or with 3 or even 4 antenna ports.

The arrangement further comprises a reconfiguration arrangement 38 for preparing the available reconfigurable physical antenna 15a2 for compensation by reconfiguring one or more antenna parameters thereof in accordance with a compensation antenna parameter set. The reconfiguration arrangement 38 may be arranged to reconfigure at least one of: antenna tilt; antenna lobe direction; antenna lobe shape; antenna azimuth; and antenna elevation, and may thus comprise actuators, such as electrical actuators.

The arrangement also comprises a transmitter (TX) 32 arranged to transmit a new compensating cell 20 from the prepared reconfigurable physical antenna 15a2 as well as a receiver (RX) 31. The UEs 18 are usually arranged to receive information transmitted over the downlink channel 16 by the radio interface transmitter (TX) 32. This information is received by the UEs 18 using a radio interface receiver (RX) 37.

Finally, a switching and reconfiguration 34, 38 arrangement is provided for upon cell recovery removing the compensating cell 20 and returning the reconfigurable physical antennas 15a2 of the compensating cell 20 to the initial antenna parameter set.

The present invention further relates to a communication network node 15a for cell outage compensation in a communication network system comprising a plurality of communication network nodes 15a, 15b communicating with one or more UEs 18, where each network node 15a, 15b is serving at least one cell 19a, 19b in which the UEs 18 are situated via two or more reconfigurable physical antennas 15a1, 15a2, 15b1, 15b2 configured according to an initial antenna parameter set.

The communication network node 15a comprises a control unit 33 for determining cell outage in a network node 15b. A switching arrangement 34 is provided for making one of the reconfigurable physical antennas 15a2 of at least one cell 19a temporarily available for compensation. Further, a reconfiguration arrangement 38 is provided for preparing the available reconfigurable physical antenna 15a2 for compensation by reconfiguring one or more antenna parameters thereof in accordance with a compensating antenna parameter set. A transmitter 32 is arranged to transmit a new compensation cell 20 from the prepared reconfigurable physical antenna 15a2. Finally, a switching and reconfiguration 34, 38 is provided for upon cell recovery removing the compensating cell 20 and returning the reconfigurable physical antennas 15a2 of the compensating cell 20 to the initial antenna parameter set.

In one embodiment the reconfiguration arrangement 38 of the communication network node 15a is arranged to prepare the available reconfigurable physical antenna 15a2 for compensation by reconfiguring one or more antenna parameters thereof in accordance with a compensating antenna parameter set through reconfiguring at least one of: antenna tilt; antenna lobe direction; antenna lobe shape; antenna azimuth; and antenna elevation.

In a further embodiment the switching arrangement 34 of the communication network node 15a is arranged to make one of the reconfigurable physical antennas 15a2 of at least one cell 19a temporarily available for compensation through transmitting n+1 virtual antenna ports from the n remaining physical antennas 15a1 of the at least one network node 15a used for transmitting the compensating cell 20.

In a still further embodiment the transmitter 32 of the communication network node 15a is arranged to transmit reference signals of the compensating cell 20 shifted in time with respect to reference signals transmitted from the n remaining physical antennas 15a1 of the at least one network node 15a used for transmitting the compensating cell 20.

In a yet further embodiment the transmitter 32 of the communication network node 15a further is arranged to schedule uplink and downlink data transmitted from the n remaining physical antennas 15a1 of the at least one network node 15a used for transmitting the compensating cell 20 in a bandwidth separated from the bandwidth allocated to the compensating cell 20.

In another further embodiment the transmitter 32 of the communication network node 15a further is arranged to allow transmissions from the n remaining physical antennas 15a1 of the at least one network node 15a used for transmitting the compensating cell 20 to split bandwidth with transmissions from the compensating cell 20 through transmissions from the compensating cell 20 being shifted in frequency with respect to transmissions from the n remaining physical antennas 15a1 of the at least one network node 15a used for transmitting the compensating cell 20.

In yet another embodiment the reconfiguration arrangement 38 of the communication network node 15a further is arranged to perform the steps of: muting at least one reconfigurable physical antenna 15a1 of the at least one network node 15a; creating a new temporary cell at the previously muted reconfigurable physical antenna 15a1; forcing handover of UEs 18 served by at least one other reconfigurable physical antenna 15a2 of the at least one network node 15a to the new cell; muting the at least one other reconfigurable physical antenna 15a2 of the at least one network node 15a and making the at least one other reconfigurable physical antenna 15a2 of the at least one network node 15a temporarily available for compensation.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method for cell outage compensation in a communication network system comprising a plurality of communication network nodes communicating with one or more user equipments, where each network node is serving at least one cell in which the user equipments are situated, via two or more reconfigurable physical antennas configured according to an initial antenna parameter set, characterised in that the method comprising:
   determining cell outage in a first cell;
   identifying a first antenna of the two or more reconfigurable physical antennas as an antenna to be made available for temporary compensation for the cell outage in the first cell, the first antenna serving a second cell at least prior to the outage;
   identifying a second antenna of the two or more reconfiqurable physical antennas as an antenna to be made available for temporary compensation for the second cell, the second antenna serving a third cell at least prior to the outage;
   making the first and second reconfigurable physical antennas temporarily available for compensation;
   preparing the first reconfigurable physical antenna for compensation of the first cell by reconfiguring one or more antenna parameters thereof in accordance with a first compensating antenna parameter set;
   preparing the second reconfigurable physical antenna for compensation of the second cell by reconfiguring one or more antenna parameters thereof in accordance with a second compensating antenna parameter set;
   transmitting to the at least two new compensating cells from the prepared first and second reconfigurable physical antennas;
   upon cell recovery of the first cell returning the first and second reconfigurable physical antennas to their respective initial antenna parameter sets.

2. A method according to claim 1, wherein preparing the available reconfigurable physical antenna for compensation by reconfiguring one or more antenna parameters thereof in accordance with a compensating antenna parameter set comprises reconfiguring at least one of: antenna tilt; antenna lobe direction; antenna lobe shape; antenna azimuth; and antenna elevation.

3. A method according to claim 1, wherein making one of the reconfigurable physical antennas of at least one cell temporarily available for compensation comprises transmitting via at least two virtual antenna ports from a single physical antenna of the at least one network node used for transmitting to the respective compensating cell.

4. A method according to claim 3, further compromising transmitting reference signals of the compensating cell shifted in time with respect to reference signals transmitted from the n remaining physical antennas of the at least one network node used for transmitting the compensating cell.

5. A method according to claim 3, further comprising scheduling uplink and downlink data transmitted from the n remaining physical antennas of the at least one network node used for transmitting the compensating cell in a bandwidth separated from the bandwidth allocated to the compensating cell.

6. A method according to claim 1, further comprising allowing transmissions from the n remaining physical antennas of the at least one network node used for transmitting the compensating cell to split bandwidth with transmissions from the compensating cell through transmissions from the compensating cell being shifted in frequency with respect to transmissions from the n remaining physical antennas of the at least one network node used for transmitting the compensating cell.

7. A method according to claim 1, wherein making one of the reconfigurable physical antennas of at least one cell temporarily available for compensation comprises: muting at least one reconfigurable physical antenna of the at least one network node; creating a new temporary cell at the previously muted reconfigurable physical antenna; forcing handover of user equipments served by at least one other reconfigurable physical antenna of the at least one network node to the new cell; muting the at least one other reconfigurable physical antenna of the at least one network node and making the at least one other reconfigurable physical antenna of the at least one network node temporarily available for compensation.

8. An arrangement for cell outage compensation in a communication network system comprising:
   a plurality of communication network nodes communicating with one or more user equipments, where each network node is serving at least one cell, in which the user equipments are situated, via two or more reconfigurable physical antennas configured according to an initial antenna parameter set;

a control unit configured to:
  determine cell outage in a first cell;
  identify a first antenna of the two or more reconfiqurable physical antennas as an antenna to be made available for temporary compensation for the cell outage in the first cell, the first antenna serving a second cell at least prior to the outage; and
  identify a second antenna of the two or more reconfigurable physical antennas as an antenna to be made available for temporary compensation for the second cell, the second antenna serving a third cell at least prior to the outage;
a switching arrangement configured to make the first and second reconfigurable physical antennas temporarily available for compensation;
a reconfiguration arrangement configured to:
  prepare the first reconfigurable physical antenna for compensation of the first cell by reconfiguring one or more antenna parameters thereof in accordance with a first compensation antenna parameter set; and
  prepare the second reconfigurable physical antenna for compensation of the second cell by reconfiguring one or more antenna parameters thereof in accordance with a second compensating antenna parameter set;
a transmitter arranged to transmit to the at least two new compensating cells from the prepared first and second reconfigurable physical antenna;
a switching and reconfiguration arrangement configured, upon cell recovery of the first cell, to return the first and second reconfigurable physical antennas to their respective initial antenna parameter sets.

9. A communication network node for cell outage compensation in a communication network system comprising a plurality of communication network nodes communicating with one or more user equipments, where each network node is serving at least one cell, in which the user equipments are situated, via two or more reconfigurable physical antennas configured according to an initial antenna parameter set, the communication network node comprising:
  a control unit configured to:
    determine cell outage in a first cell;
    identify a first antenna of the two or more reconfiqurable physical antennas as an antenna to be made available for temporary compensation for the cell outage in the first cell, the first antenna serving a second cell at least prior to the outage; and
    identify a second antenna of the two or more reconfigurable physical antennas as an antenna to be made available for temporary compensation for the second cell, the second antenna serving a third cell at least prior to the outage;
  a switching arrangement configured to make the first and second reconfigurable physical antennas temporarily available for compensation;
  a reconfiguration arrangement configured to:
    prepare the first reconfigurable physical antenna for compensation of the first cell by reconfiguring one or more antenna parameters thereof in accordance with a first compensating antenna parameter set; and
    prepare the second reconfigurable physical antenna for compensation of the second cell by reconfiguring one or more antenna parameters thereof in accordance with a second compensating antenna parameter set;
  a transmitter arranged to transmit to the at least two new compensation cells from the prepared first and second reconfigurable physical antenna;
  a switching and reconfiguration arrangement configured, upon cell recovery of the first cell, to return the first and second reconfigurable physical antennas to their respective initial antenna parameter sets.

10. A communication network node according to claim 9, wherein the reconfiguration arrangement is arranged to prepare the available reconfigurable physical antenna for compensation by reconfiguring one or more antenna parameters thereof in accordance with a compensating antenna parameter set through reconfiguring at least one of: antenna tilt; antenna lobe direction; antenna lobe shape; antenna azimuth; and antenna elevation.

11. A communication network node according to claim 9, wherein the switching arrangement is arranged to make one of the reconfigurable physical antennas of at least one cell temporarily available for compensation through transmitting via at least two virtual antenna ports from a single physical antenna of the at least one network node used for transmitting to the compensating cell.

12. A communication network node according to claim 11, wherein the transmitter is arranged to transmit reference signals of the compensating cell shifted in time with respect to reference signals transmitted from the n remaining physical antennas of the at least one network node used for transmitting the compensating cell.

13. A communication network node according to claim 11, wherein the transmitter further is arranged to schedule uplink and downlink data transmitted from the n remaining physical antennas of the at least one network node used for transmitting the compensating cell in a bandwidth separated from the bandwidth allocated to the compensating cell.

14. A communication network node according to claim 9, wherein the transmitter further is arranged to allow transmissions from the n remaining physical antennas of the at least one network node used for transmitting the compensating cell to split bandwidth with transmissions from the compensating cell through transmissions from the compensating cell being shifted in frequency with respect to transmissions from the n remaining physical antennas of the at least one network node used for transmitting the compensating cell.

15. A communication network node according to claim 9, wherein the reconfiguration arrangement further is arranged to perform the steps of: muting at least one reconfigurable physical antenna of the at least one network node; creating a new temporary cell at the previously muted reconfigurable physical antenna; forcing handover of user equipments served by at least one other reconfigurable physical antenna of the at least one network node to the new cell; muting the at least one other reconfigurable physical antenna of the at least one network node and making the at least one other reconfigurable physical antenna of the at least one network node temporarily available for compensation.

* * * * *